Figure 1:
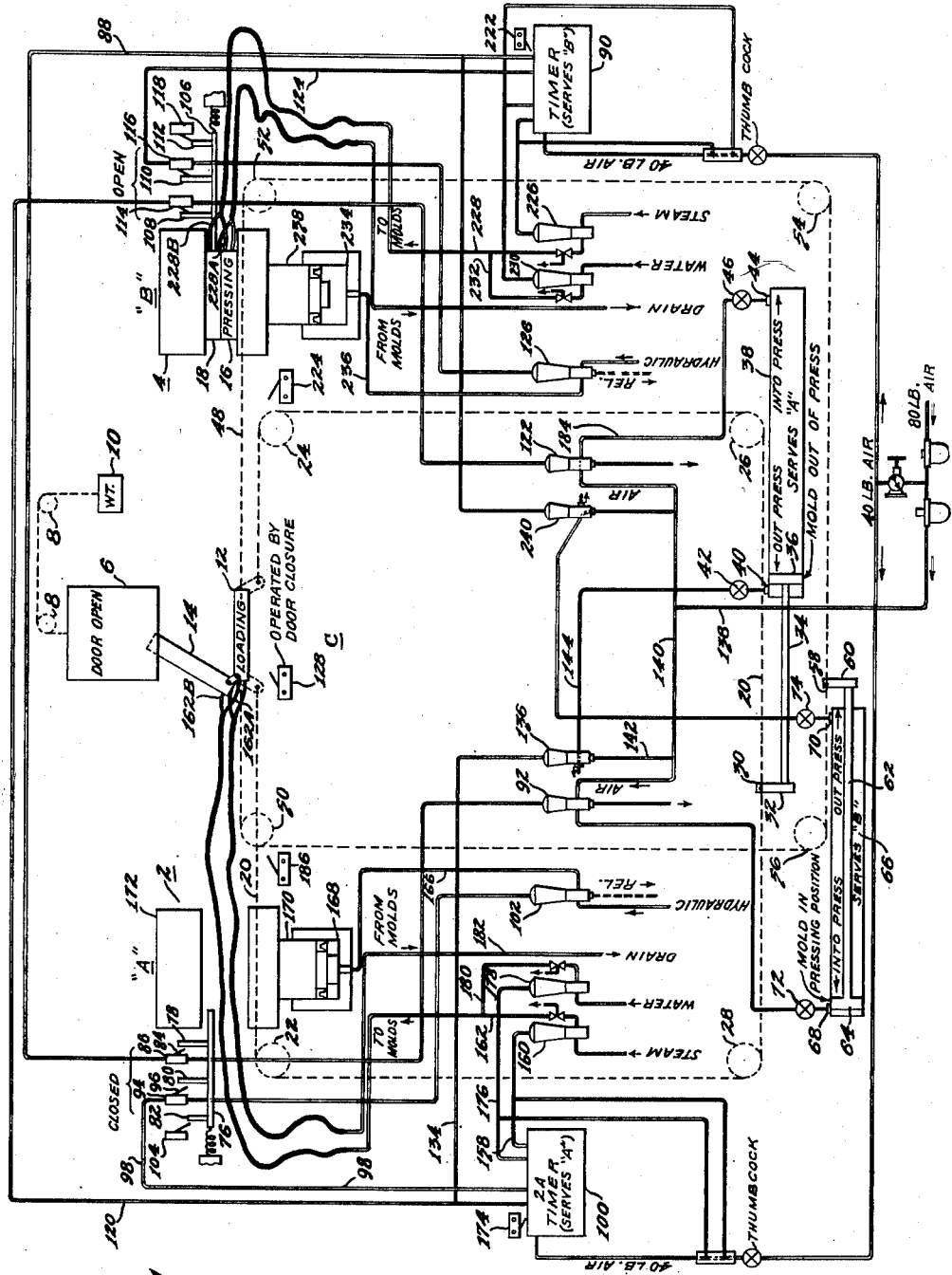

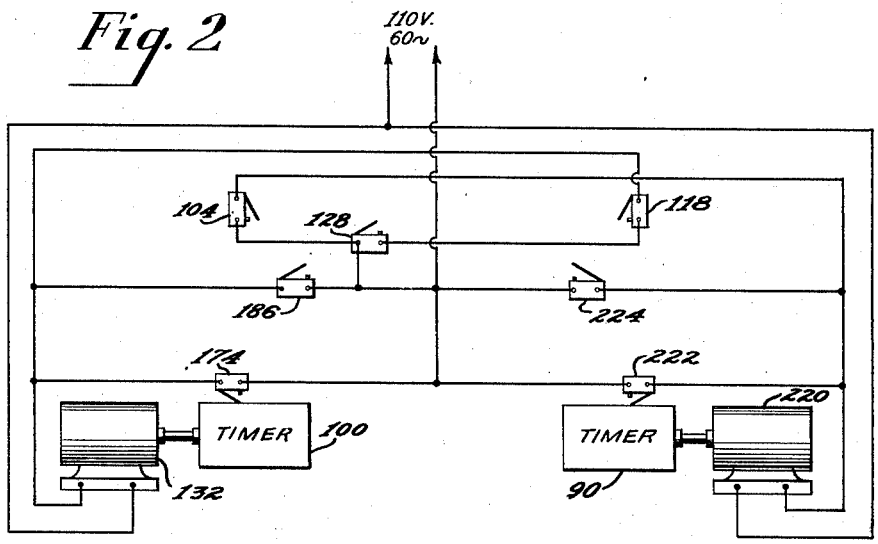
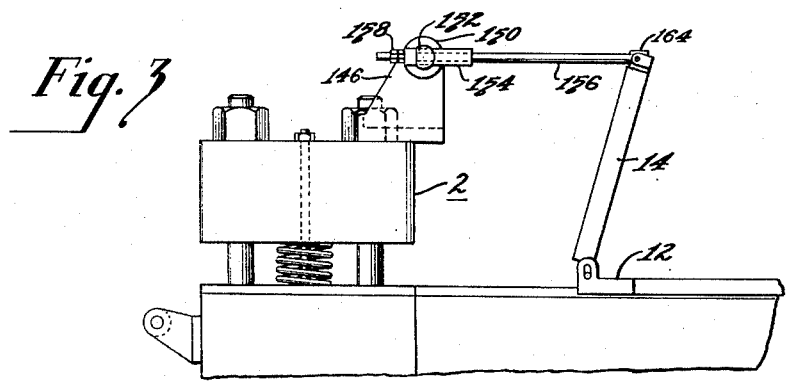
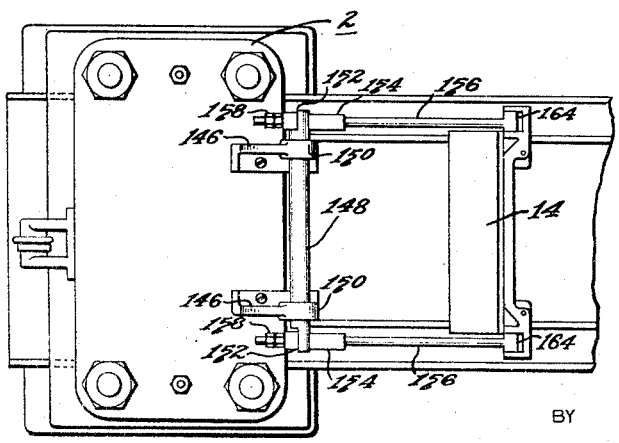

May 8, 1951 H. I. REISKIND ET AL 2,552,458
MOLDING PRESS
Filed Jan. 30, 1948 3 Sheets-Sheet 3
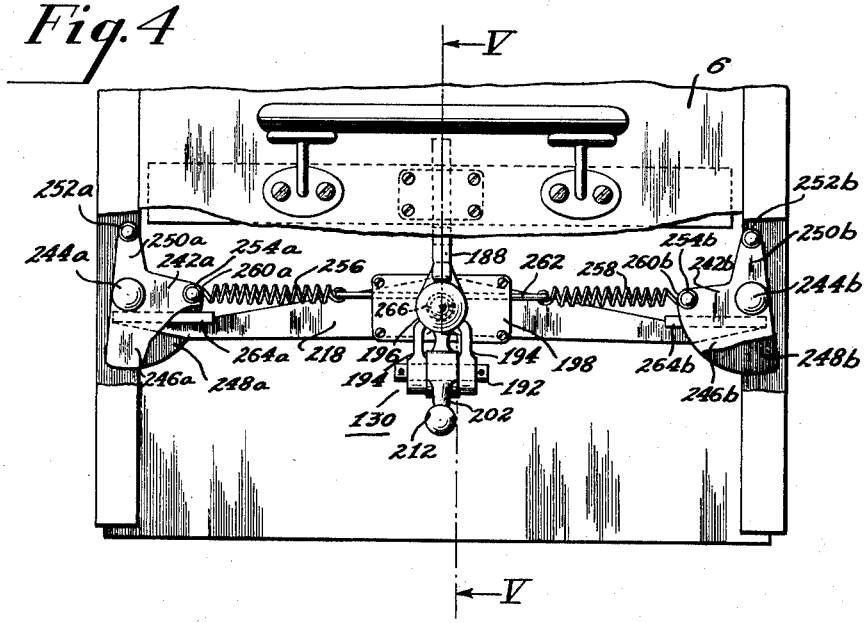
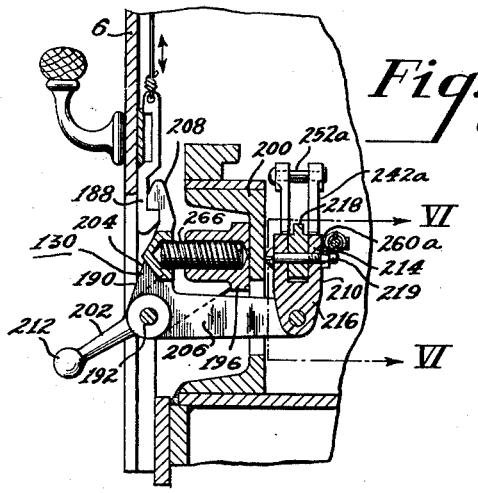
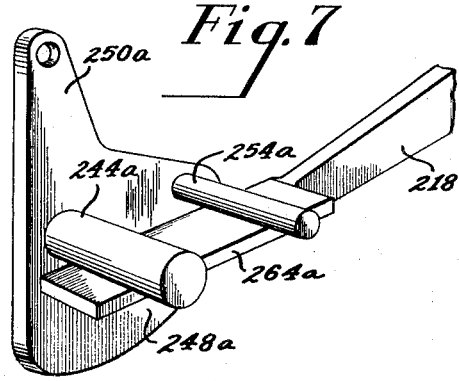
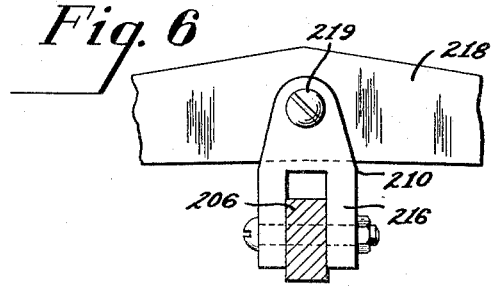
INVENTOR
*Hillel I. Reiskind &*
*George W. Longacre*
BY
ATTORNEY Patented May 8, 1951

2,552,458

UNITED STATES PATENT OFFICE 2,552,458

MOLDING PRESS

Hillel I. Reiskind, Elkins Park, Pa., and George W. Longacre, Swedesboro, N. J., assignors to Radio Corporation of America, a corporation of Delaware Application January 30, 1948, Serial No. 5,344

8 Claims. (Cl. 18—16)

This invention relates, in general, to improvements in presses for molding plastic materials. More particularly, the invention relates to improvements in presses for carrying out a series of molding operations in a completely autiomtaic manner after the presses have been loaded by an operator and a starting switch has been actuated. It also relates specifically to improvements in multiple type presses in which a plurality of sets of pressing platens are loaded by an operator at a single loading station but are moved to individual pressing stations for the application of molding pressure and any other operations necessary to the carrying out of a complete molding cycle upon the materials.

The present invention also relates to improved safety features for protecting a press operator against possible injury and to apparatus providing improved simplicity of press operation and higher rates of production of molded articles.

One object of the invention is to provide an improved molding press of the multiple type.

Another object of the invention is to provide a multiple type molding press having a single loading station and a plurality of separate pressing stations.

Another object of the present invention is to provide an improved multiple molding press of the reciprocating type which is automatic in operation after loading and starting of a molding cycle.

Another object of the invention is to provide a multiple type molding press for carrying out a molding cycle automatically and in which one set of platens is not returned to a loading station until other sets of platens are positioned at their respective pressing stations.

Another object of the invention is to provide an improved multiple type molding press including means for carrying out a heating and cooling cycle during each molding operation.

Another object of the invention is to provide a molding press having improved safety features including an automatically opened loading door.

These and other objects will be more apparent and the invention will be better understood from the following specification including the drawings, of which Fig. 1 is a schematic diagram of a molding press embodying certain features of the present invention and showing, especially, the piping layout, Fig. 2 is a simplified schematic wiring diagram for the control switches included in the apparatus of Fig. 1, Fig. 3 is a front elevation view of the mechanism for opening and closing the press platens of Fig. 1, automatically, Fig. 3A is a plan view of the apparatus of Fig. 3, Fig. 4 is a partially cut-away front view of the mechanism for automatically opening the press loading door, Fig. 5 is a section view taken along the line V—V of Fig. 4, Fig. 6 is a front view partially in section taken along the line VI—VI of Fig. 5, and Fig. 7 is an enlarged detail view in perspective of part of the apparatus of Fig. 4 with the front plate of a bell crank removed.

Although the improvements in molding presses which are a part of the present invention can obviously be applied to presses for compression molding of any product molded of plastic materials, whether or not heating and cooling cycles are required, the embodiment which will be more fully described hereinafter will be illustrated in connection with apparatus for molding disc phonograph records by the application of hydraulic pressure to pairs of platens faced with dies having grooved sound tracks formed therein.

As illustrated in Figure 1, the apparatus includes, in general, a pressing station A, including a hydraulic press 2 and a pressing station B, including a similar hydraulic press 4, which are positioned one on either side of a loading station indicated generally at C. The entire front of the apparatus, including the two presses, is adapted to be covered by a metallic shield (not shown) for the protection of the operator.

At the loading station C, there is an aperture in the protective shield to permit loading of the presses by the operator. This aperture is exposed by the opening of a loading door 6 suspended from pulleys 8 and balanced by a counterweight 10 so that the door is automatically raised by the counterweight and may easily be lowered by one hand with the application of a small amount of force.

The press 2 is adapted to receive a set of platens which may comprise a single hinged pair consisting of a lower platen 12 and an upper platen 14 but may also be adapted to accommodate a stack of platens constituting a plurality of pressing units. The other press 4 is adapted to receive a similar pair of platens 16 and 18, or more, as desired. The lower platen of each set is adapted to ride on tracks (not shown) which extend between the loading station C and the pressing stations A and B.

Means are provided for moving each set of platens between the loading station and its respective pressing station. For example, the lower platen 12 of the set adapted to be received by the press 2 is connected to a chain 20 passing around pulleys 22, 24, 26 and 28. Alternatively, a cable or belt may be used instead of a chain. A link 30 of the chain 20 is attached to a member 32 extending outwardly from one end of a piston rod 34. On the opposite end of the piston rod 34 is a piston 36 adapted to fit snugly within the inner walls of a cylinder 38 and to reciprocate therein with a length of stroke determined by the distance between the loading station C and the pressing position in the press 2 at pressing station A. In the drawing, the distance between the loading station C and each pressing station A or B has been exaggerated for convenience of illustration and to avoid crowding.

The piston 36 is moved back and forth within the cylinder in either direction as desired by the admission of fluid under pressure to the proper end. For example, in order to move the piston toward the right, fluid is admitted to the left hand end of the cylinder through an entrance port 40 under the control of a speed control valve 42 and to move the piston to the left, fluid is admitted to the right hand end of the cylinder through an entrance port 44 under the control of speed control valve 46. In the embodiment shown, the fluid used for applying pressure within the cylinder is air, but, obviously, other suitable fluids, such as oil or steam, could be used.

In a similar manner, the lower platen 16 of the set adapted to be received by the press 4 is attached to another chain 48 running over pulleys 50, 52, 54 and 56, and a link 58 of the chain 48 is connected to a member 60 connected to one end of a piston rod 62 on the opposite end of which is a piston 64 adapted to reciprocate within a cylinder 66. This cylinder has a left hand entrance port 68 and a right hand entrance port 70 and corresponding speed control valves 72 and 74.

The movement of the sets of platens into their respective presses causes the actuation of certain press valves and limit switches having various control functions. For example, the movement of platens 12 and 14 into pressing position in the press 2 causes inward movement of spring-biassed plunger 76 having stops 78, 80 and 82 affixed thereto. The stop 78 presses against a lever arm 84 opening the normally closed air valve 86 and thus opens a passage in the air line 88 from timer 90 to the diaphragm of three-way valve 92. The stop 80 similarly opens a passage in the air line 96, through normally closed valve 94 by actuation of a lever 96, from timer 100 to the three-way valve 102. The stop 82 closes a normally open microswitch 104 having a control function which will be described later. When the platens are withdrawn from the press 2, the biassing pressure of the spring pushes plunger 76 in an outward direction, thus closing valves 86 and 94 and opening limit switch 104.

In a similar manner, the set of platens 16 and 18, when moved into position in press 4, push inwardly a spring biassed plunger 106 having stops 108, 110 and 112, which close valves 114 and 116 and open limit switch 118, respectively. The valve 114 is in the air line 120 leading from the timer 100 to three-way valve 122 and valve 116 is in the air line 124 leading from the timer 90 to three-way valve 126. The function of limit switch 118 will be pointed out later.

Further details of operation of the illustrated embodiment of the invention will now be given. It will be assumed, for descriptive purposes, that the platens 16 and 18 have previously been loaded with a charge of material to be molded and have been closed and are in position in the press 4 at pressing station B undergoing a cycle of molding operations. The other set of platens 12 and 14 is in position at the loading section C, the platens are in the open position ready to receive a charge of moldable material and the loading door 6 is open to permit access by the operator.

The operator places a charge of material between the platens and lowers the loading door 6 to the closed position until it closes a microswitch 128 and, thereupon, starts an automatic cycle of operations. The door is also held in its closed position by means of a latch 130 which will be more particularly described later.

Referring now, also, to the wiring diagram of Figure 2, the closing of microswitch 128 completes a circuit through closed limit switch 118 on press 4 and the motor 132 of timer 100 which controls the operation of press 2. The timer may be of a well known type comprising a drum carrying a series of parallel grooves having cam segments fixed thereon of predetermined and varying length. Upon the cam segments of each track rides a cam follower connected to a shaft carrying a valve closure member. As the timer is driven by the motor 132, the drum rotates and the cam followers are raised and lowered in a predetermined sequence, thus opening or closing corresponding valves opening into an air manifold.

The motor 132 causes the drum of timer 100 to rotate. One of the timer valves is opened allowing 40 lb. air pressure to enter the air line 120 and to be applied through this line via the open press valve 114 to the diaphragm of three-way valve 122 and also through the branch air line 134 to the diaphragm of three-way valve 136.

The actuation of the diaphragm of valve 136 by 40 lb. air pressure through air line 134 opens an air passage in this valve to permit 80 lb. air pressure from the air supply to be applied through air line 138 and branch lines 140, 142 and 144 and through air entrance port 40 to the left hand end of cylinder 38, thus causing piston 36 to move from left to right and, consequently, causing the chain 20 to move in a counterclockwise direction. The set of platens 12 and 14 attached to chain 20 is thus moved from loading station C toward pressing station A.

As the platens move toward press 2, they are closed automatically by the apparatus illustrated more particularly in Figures 3 and 3A. To the top of the press are bolted a pair of brackets 146 extending between which is an axle 148 supported on bearings 150. The ends of the axle are extended through and beyond the bearings. In both outer ends of the axle which extend beyond the bearings are bored parallel cylindrical passages 152 extending through a partially cut away diameter of the axle. A fixed cylindrical sleeve 154 is inserted in each of the passages. In each of the sleeves 154, there is slidably positioned a lever arm 156 having a stop nut 158 placed adjustably near one end. The opposite ends of each of the arms 156 are pivotally connected to a lip of the upper platen of each pair through a joint 164. Thus, as the platens move toward the press 2, the upper plate 14 is guided to its closed position opposing the lower platen 12 by the lever arms 156 which not only pivot at the bearings 150 but slide backward through the sleeves 154 to accommodate themselves to the shortening distance between the lip of the upper platen and the bearings 150. Obviously, when the press platens are again moved out of the press to the loading position, the upper platen is automatically guided to the open position by the lever arms.

Returning once more to the operation of the air cylinder 38 as shown in Figure 1, 40 lb. air pressure is also applied during the same part of the cycle of timer 100 through air line 120 through the open press valve 114 to the diaphragm of three-way valve 122. Valve 122 is a reverse acting valve and the application of the 40 lb. air pressure to its diaphragm causes the opening of an air passage in this valve which permits air to exhaust from the other end of cylinder 38 through port 44.

Also, during the same portion of the cycle of timer 100, another timer valve opens permitting 40 lb. air pressure to flow in air line 158 actuating a diaphragm in valve 160 which opens a passage in this valve permitting steam from the steam inlet to flow through the line 162 to the platens 12 and 14 through branches 162A and 162B, respectively, heating the platens to a desired temperature.

As the drum of timer 100 continues to rotate and when the platens 12 and 14 are in pressing position in press 2, another timer valve opens allowing 40 lb. air pressure to be applied through air line 98, including the now open limit valve 94, to the diaphragm of three-way valve 102 in a manner such that a passage is opened in this valve permitting hydraulic fluid to flow from the hydraulic fluid supply inlet through hydraulic line 166 to the pressure cylinder 168 of press 2. The application of hydraulic pressure to the cylinder 168 forces hydraulic ram 170 upward and exerts proper molding pressure on platens 12 and 14 against a block 172. To permit the slight stretching of chain 20 caused by the upward movement of platen 12, it may have a take-up spring (not shown) positioned between any two suitable links.

In order to prevent the stopping of the motor 132 driving the drum of time 100 before its cycle is completed, which undesired event would normally occur when the other set of platens is returned to loading position, a control switch 174 is positioned with relation to the drum of timer 100 such that as the drum starts to rotate, a cam follower forces a plunger outward and closes the switch. This completes an alternate circuit from the 100 V. supply line through the motor and keeps it supplied with current even though the loading door switch 128 be opened due to the opening of the loading door 6.

After the timer 100 continues through its cycle for a predetermined period of time, the valve controlling the air pressure in air line 158 closes and, consequently, closes the steam passage in valve 160 cutting off the steam supply to the platens 12 and 14. Immediately thereafter, a timer valve opens to admit air through an air-line 176 to a diaphragm in three-way valve 178 which opens a passage in this valve permitting cold water to enter from the water supply and through branch water line 180 to the main line 162, thus permitting cold water to enter the platens and chill them. This, in turn, causes the cooling of the molded article, in this instance a phonograph record, between the dies.

After a further predetermined period, the timer closes the valve controlling the air pressure in air line 176, thus closing the water passage in valve 178 and the water begins to drain from the platens by gravity through drain line 182. At about the same time, the timer valve controlling air pressure in line 164 closes and thus closes the hydraulic fluid passage in valve 102. The consequent lowering of the hydraulic pressure in hydraulic line 166 causes the hydraulic piston to return to its lower position releasing the molding pressure.

At the same time, the timer valve controlling the air pressure in the air line 120 and branch line 134 closes, cutting off the 40 lb. air pressure to the diaphragms of valves 136 and 122 which consequently cuts off the supply of 80 lb. air pressure to the branch air line 144.

This part of the timer cycle is ended by the opening of timer switch 174 which cuts off the power supply to the motor 132.

The platens 12 and 14 remain in the press 2 until the other set of platens 16 and 18 have been loaded at the loading station C and have moved into the other press 4. The moving of platens 16 and 18 into press 4 closes the press limit valve 114, allowing air from valve 122 to exhaust back through timer 100, thereby closing valve 122 and allowing 80 lb. air pressure to enter the right hand end of air clyinder 38 through air line 184 and entrance port 44. This causes piston 36 to move from right to left and, consequently, causes chain 20 to move in a clockwise direction pulling platens 12 and 14 out of the press 2 and back to the loading station C.

As the platens move toward the loading station, they momentarily close a normally open microswitch 186 and trip open a latch designated generally at 130, releasing the closed loading door 6 which then is raised automatically by its counterweight 10.

The mechanism of the loading door latch and its actuating means are shown more particularly in Figures 4, 5, 6 and 7. The latch comprises, in general, a toothed member 188 and an escapement lever 190. Suitable mechanism is provided for operating the latch either manually, or automatically by the movement of either set of platens.

The toothed member 188 is attached near the lower edge of the loading door 6. The escapement lever 190 is pivotally supported at 192 between the forked arms 194 of a bracket 196, which bracket is provided with a plate 198 bolted to the supporting frame 200 of the press. The escapement lever may be substantially Y shaped, having a leg portion 202 and two arms 204 and 206. One of the arms 204 is an upwardly extending member terminating in a toothed portion 208 which is adapted to engage the toothed member 188 when the loading door is in closed position. The other arm 206 extends rearwardly and at its extremity is pivotally connected to a shackle 210. The leg portion 202 of the escapement lever extends outwardly from the frame of the press, ending in a handle 212 which the operator may raise when it is desired to open the door 6 non-automatically.

The shackle 210 comprises an upper forked portion 214 and a lower forked portion 216, the axes of the two forked portions being positioned at right angles to each other. The lower forked portion is adapted to fit over the extremity of the escapement arm 206 to which it is pivotally bolted. The upper forked portion 214 of the shackle pivotally supports the center of a tripping bar 218 by means of a bolt 219. When the center of the tripping bar is depressed, the downward motion of the bar is transmitted through the shackle 210 to the rearwardly extending arm of the escapement lever. This results in the lever rotating about its pivotal support 192 and causes the upwardly extending arm 204 of the lever to rock backward, disengaging the teeth of the latch and permitting the door 6 to be pulled upward by action of the counterweight 10.

There will now be described the mechanism for automatically depressing the tripping bar, said mechanism being more particularly illustrated in Figures 4 and 7. Positioned at either side of the loading door are bell crank levers 242a and 242b. Each of these levers is pivotally supported on the frame of the press by bolts 244a and 244b, respectively, and comprises a front plate 246a or 246b and a parallel rear plate 248a or 248b spaced a suitable distance apart. In its normal rest position, each pair of parallel plates includes a pair of upwardly extending lever arms 250a or 250b, the extremities of which are fastened together with bolts 252a or 252b. A horizontally extending arm is, in effect, provided on each of the levers by bolting each pair of plates together with bolts 254a or 254b, suitably spaced horizontally from the pivotal points 244a and 244b and adjacent the inner or leading edges of the plates.

The bell crank levers are maintained in their normal rest position; that is, with the arms 250a or 250b extending upwards, by biassing springs 256 and 258 positioned between the two bell cranks and attached thereto by means of lugs 260a or 260b constituted by a portion of bolts 252a or 252b extending through the rear plates 248a or 248b. The springs may extend for only a part of the span between the two bell cranks and may be joined through a bar 262 connected to an end of each spring.

The tripping bar 218 is provided with flanges 264a and 264b adjacent its ends. These flanged portions are positioned between the parallel plates of the bell cranks such that their flat upper surfaces are located below the horizontal lever arm bolts 254a and 254b, respectively. The plates of the bell cranks thus serve as guide means for the tripping bar.

The action of the above described mechanism in automatically opening the loading door is as follows: Say, for example, that platens 12 and 14, having been subjected to a pressing cycle in press 2, are being returned to the loading station C for re-loading. The leading edge of lower platen 12 strikes the outer edge of upwardly extending arm 250a of the bell crank 242a causing the crank to rotate about its pivotal bolt 244a. This depresses the horizontally positioned bolt 254a, causing it to press downwardly against the flange 264a of the tripping bar 218. The downward motion of the tripping bar is also transmitted through its pivot bolt 219 causing the escapement lever 190 to rotate about its pivotal support 192, as previously described, and disengaging the door latch. When the trailing edge of the platen 12 has cleared the end of arm 250a, the biasing tension of springs 256 and 258 brings the bell crank 242a back to its original rest position.

The return of the tripping mechanism to its normal position is also aided by the biassing pressure of a spring 266 seated in bracket 196, which spring extends into a seat formed in the upwardly extending arm 204 of the escapement lever 190, the forward pressure of the spring 266 against the arm 204 being transmitted through the rearwardly extending arm 206 of the escapement lever to the shackle 210 and tripping bar 218.

By means of the operation of the above described mechanism, the loading door 6 is automatically opened when a set of platens is at the loading station ready to have the molded article removed and a fresh charge inserted.

When the platens have been re-loaded and the loading door 6 has been pulled down to its closed position, the platens automatically are pulled back into the press 2 but the latching mechanism remains unactuated since the bell crank 242a is rocked outwardly and thus the bolt 254a does not depress the tripping bar.

Various modifications of the above described door opening mechanism will be apparent to those skilled in the art. Electromagnetic release mechanism actuated by a tripping switch could, for example, also, be used. The essential thing is that the loading door be opened automatically just as the platens arrive at the loading station in order to have a maximum safety factor and minimum loss of time in re-loading.

The previously described momentary contact of the platens 12 and 14 with microswitch 186 closes a circuit through the motor of timer 100, again starting the timer. As soon as the timer drum starts to rotate, timer switch 174 is again closed, applying 110 v. current through a circuit to the timer motor, which keeps the motor in operation after the switch 186 is again released, due to the moving to one side of the platens. When the timer starts, a timer air valve is opened applying 40 lb. air pressure through air line 156 to the diaphragm of valve 160 opening the passage therein, which permits steam to enter the platens, preheating them for the next cycle. After a predetermined period of preheating, the timer valve shuts off the 40 lb. air pressure through line 158, closing the steam passage through valve 160. The timer switch 174 is then opened and the motor stops once more. This completes one entire cycle of operations for press 2.

The operation of the other press 4 is exactly the same except, of course, that the operations are controlled by timer 90 driven by a motor 220 while another set of valves and switches controls the operation. The operation of timer switch 222 corresponds to that of the switch 174. The microswitch 224 corresponds in operation to microswitch 186, loading door switch 128 being common to both presses.

The valve 226 admits steam to platens 16 and 18 through line 228 having branches 228A and 228B, while valve 230 admits water thereto through branch line 232. The operation of these valves corresponds to that of valves 160 and 178, respectively. The valve 126 admits hydraulic fluid to the cylinder 234 of the press 4 through the line 236 for operation of its hydraulic ram 238 when limit valve 116 is open.

With regard to moving platens 16 and 18 between the loading station C and the pressing station B, the valves 240 and 92 act similarly in admitting air to and exhausting it from cylinder 66 to the valves 122 and 136 functioning with respect to the first cylinder 38.

The press limit switch 104 also acts in a similar manner to switch 118 in preventing the platens 16 and 18 from returning to the loading station before the other set of platens has been positioned in press 2.

There has thus been described a molding press by means of which an operator, loading at a single station, can control two or more presses with a maximum of speed. The arrangement of the valves and timing mechanism is such that different articles having considerably different molding cycles can be molded simultaneously at the different pressing stations, if desired, since valving and timing is independently controlled even though interlocked. The entire operation is also entirely automatic after the closing of the loading door.

We claim as our invention:

1. A multiple type press for molding articles, comprising a plurality of sets of pressing platens, separate pressing stations for each of said sets, a single loading station adapted to accommodate only one of said sets at a time, a loading door at said loading station, independent means for alternately moving each of said sets of platens between said loading station and its respective pressing station, means associated with each of said sets of platens for performing a cycle of desired molding operations thereon, and means located at said loading station for initiating a completely automatic series of events in response to the closing of said loading door at said loading station, said events comprising closing a set of platens, moving said set of platens to its pressing station, carrying out said cycle of molding operations, returning the platens to said loading station, and opening said set of platens, all in a desired time sequence.

2. In a multiple type molding press a plurality of sets of platens, separate pressing stations for each of said sets, means for performing a cycle of molding operations upon each of said sets, a single loading station for all of said sets, said loading station being adapted to accommodate only one of said sets at a time, and independent means for alternately moving each of said sets between the loading station and its respective pressing station.

3. A press according to claim 2 including means at said loading station for initiating a completely automatic series of operations upon each of said sets, said series comprising moving a set of said platens to its pressing station, performing said cycle of molding operations and returning the set of platens to the loading station.

4. A press according to claim 3 in which said initiating means comprises a loading door and switch means actuated by the closing of said door.

5. A multiple type molding press comprising a plurality of sets of platens and separate pressing stations to accommodate each of said sets, a loading station, means for alternately moving each of said sets between its respective pressing station and the loading station, means associated with each of said sets for performing a cycle of molding operations thereon, means for automatically carrying out in timed sequence a series of events comprising the moving of each of said sets from the loading station to its pressing station, said cycle of molding operations and the returning of said set to the loading station after the completion of its molding cycle and means for preventing the return of any of said sets of platens to the loading station while another of said sets is positioned thereat.

6. In an automatic molding press comprising (1) a set of platens, (2) a loading station including a loading door, and (3) a pressing station, means for moving said set of platens between the loading station and the pressing station, means for automatically closing and for opening said platens in proper sequence while said platens are in motion, means responsive to the closing of said door for initiating the movement of said platens from said loading station to said pressing station and, means responsive to the movement of said platens from said pressing station to said loading station for opening said door automatically.

7. A press according to claim 6 wherein said means for opening said door includes means for accomplishing the opening in timed relation to the arrival of said platens at said loading station.

8. A multiple type automatic molding press comprising a plurality of sets of platens, a corresponding plurality of pressing stations, a single loading station including a loading door, independent means for moving each of said sets of platens between the loading station and a pressing station, means responsive to the closing of said door for initiating the movement of each of said sets of platens from said loading station to its respective pressing station and means responsive to the movement of any of said sets of platens from a pressing station to said loading station for opening said door automatically.

HILLEL I. REISKIND.
GEORGE W. LONGACRE.

REFERENCES CITED

The following references are of record in the file of this patent:

UNITED STATES PATENTS

| Number | Name | Date |
| --- | --- | --- |
| 1,569,002 | Crudginton et al. | Jan. 12, 1926 |
| 1,930,931 | Fernberg | Oct. 17, 1933 |
| 2,431,048 | Kilborn | Nov. 18, 1947 |
| 2,433,654 | Dinzl | Dec. 30, 1947 |